Dec. 18, 1956     H. B. THYSELL     2,774,419
VENETIAN BLIND
Filed Oct. 20, 1953
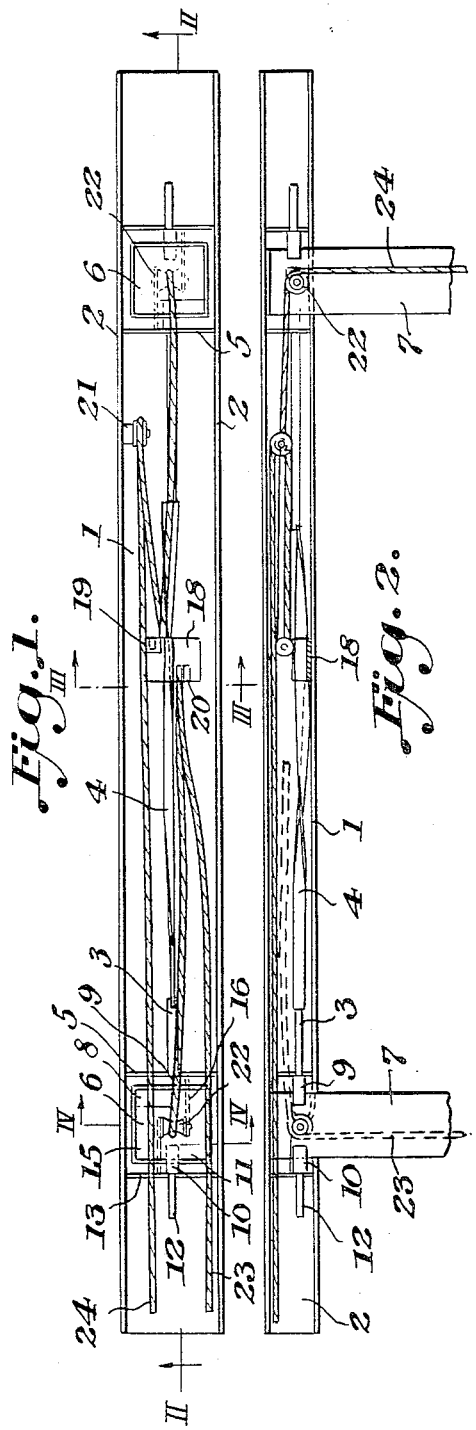
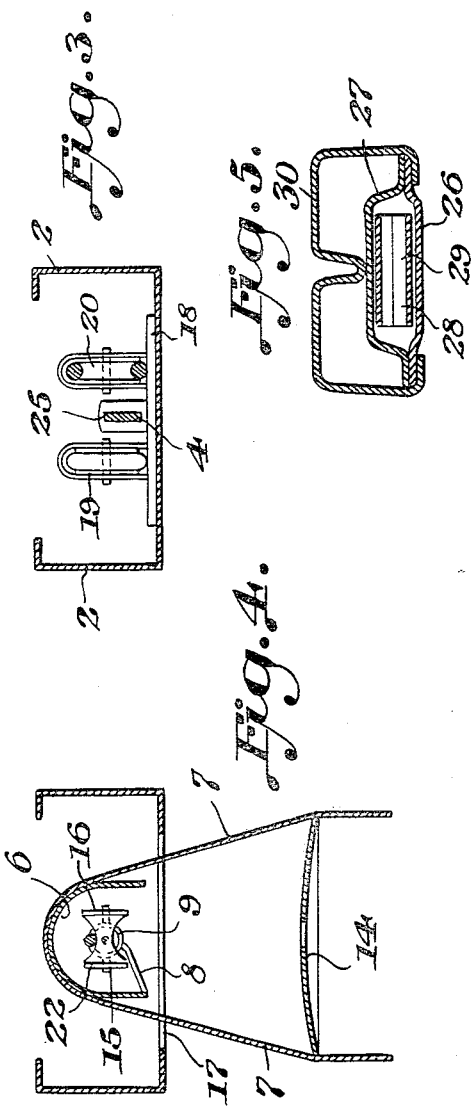
INVENTOR.
*Hans Borje Thysell,*
BY *Wenderoth, Lind & Ponack*
ATTYS.

United States Patent Office 2,774,419
Patented Dec. 18, 1956

2,774,419

VENETIAN BLIND

Hans Börje Thysell, Anderslov, Sweden

Application October 20, 1953, Serial No. 387,173

Claims priority, application Sweden October 23, 1952

6 Claims. (Cl. 160—168)

This invention relates to a Venetian blind having slats which are raisable and lowerable and capable of being set in any desired angular position.

The main object of the invention is to provide such a Venetian blind wherein the control cords for setting the slats of the Venetian blind in different angular positions can also be used for raising and lowering the slats, whereby said slats are operated wholly by means of one pair of control cords only.

For this purpose the Venetian blind according to the invention comprises one or more shafts disposed in the head rail of the Venetian blind longitudinally thereof, said shafts being connected with drums or similar means which carry the slat supporting ladder tapes of the Venetian blind, a part of the shaft or shafts being formed as a screw, and a slide reciprocable in the head rail of the Venetian blind and provided with apertures adapted to the cross-sectional form and size of the screw or screws, which are introduced into said apertures, said slide being so connected with the control cords that it is moved in one direction when a pull is exerted in one cord only and in the opposite direction when a pull is exerted in the other cord only, whereby the shaft or shafts are rotated and the angular position of the slats is changed, and the Venetian blind is substantially characterized in that the slide is provided with cord pulleys over which the control cords pass, and in that said cords extend over guide pulleys or the like, mounted in the head rail, down to, and are connected with, the bottom rail of the Venetian blind so that the slats can be raised by a pull exerted simultaneously in both control cords.

Further objects and advantages of the invention will become apparent from the following description, reference being had to the accompanying drawings illustrating a preferred embodiment of the Venetian blind. In the drawing:

Fig. 1 shows the Venetian blind as seen from above.

Fig. 2 is a vertical section on line II—II in Fig. 1.

Fig. 3 is a vertical section on line III—III in Fig. 1.

Fig. 4 is a vertical section on line IV—IV in Fig. 1.

Fig. 5 is a vertical section of an alternative embodiment of a slide for a Venetian blind according to Figs. 1 to 3.

The Venetian blind shown comprises a head rail 1 which supports the other parts of the Venetian blind and which is provided at its longitudinal sides with vertically upwardly directed side walls 2. In the middle of the head rail there is disposed a longitudinal shaft 3, part of which is formed as a screw 4 with a large pitch. The shaft 3 has its ends rotatably mounted in transverse supports 5 which are secured to the side walls 2 of the head rail. Drums 6 are fixed at the ends of the shaft 3 and slat supporting ladder tapes 7 are secured to the upper faces of said drums. The drums 6 are open at the sides longitudinally of the Venetian blind and downwardly. One lower edge of the drum 6 is connected by means of an arm 8 with a sleeve 9 which is passed onto and non-rotatably connected with the end of the shaft 3. The other lower edge of the drum 6 is secured by means of a similar arm 11 to a sleeve 10 which is likewise passed onto and secured to an axle journal 12 which is mounted in a transverse support 13 attached to the two vertical side walls 2 of the head rail as are the supports 5. The drum 6 is thus supported by the shaft 3 and the axle journal 12 and a rotation of the shaft 3 will therefore result in a rotation of the drum 6 and of the slats 14 supported by the ladder tapes 7.

Each drum 6 moreover has a cord pulley 22 which is mounted for rotation in arms 15, 16 which in turn are secured each in a transverse support 5 and 13, respectively. The head rail 1 is provided beneath each drum 6 with a recess 17 for the slat supporting ladder tapes 7 and the control cords.

Mounted in the main bar is a reciprocable slide 18 which is provided with an aperture 25 adapted to the cross-sectional form and size of the screw 4 and through which the screw extends. Furthermore, two cord pulleys 19 and 20 are rotatably arranged on the slide 18. Instead of the two cord pulleys 19 and 20 it is possible to arrange on the slide a single pulley which is provided with two grooves, one for each control cord. In such a case the function of the blind will be more reliable. A slide of this type is shown in cross section in Fig. 5. The slide consists in this case of two spaced plates 26 and 27 which are interconnected along two opposed lateral edges and form a channel between the plates. In the channel there is mounted a horizontal pulley 28 provided with two grooves and rotatably supported on a pin 29 secured in the two plates 26 and 27. At some distance above the upper plate 27 there is arranged another plate 30, the side edges of which are bent downwardly with the ends folded in under the lower plate 26 and attached thereto. The upper plane portion of the plate 30 is also provided with a channel-shaped groove formed by a portion of the plate being forced downwards. Said groove corresponds to the opening 25 in the slide 18 shown in Fig. 3 and is intended to recieve and guide the screw 4. A cord pulley 21 for one control cord is secured to one of the side walls 2 of the head rail or possibly to a transverse support disposed between said walls.

One control cord 23 of the blind extends from the slats of the blind upwards over the left-hand cord pulley 22 (as viewed in Figs. 1 and 2), and thence substantially longitudinally of the head rail to the slide 18 where it passes over the pulley 20 and from there it is led in the opposite direction outside of the head rail of the blind, where it is available for setting of the slats and raising or lowering of the blind. The other control cord extends from the slats of the blind upwards over the right-hand cord pulley 22 (as viewed in Figs. 1 and 2), thence to the pulley 19 on the slide 18 and after that to the pulley 21 secured to the side wall 2 and leaves the head rail 1 of the blind in the same direction as the cord 23.

Raising and lowering of the blind is effected in the customary manner by pulling or releasing both control cords 23 and 24 simultaneously. However, if it is desired to change the angular position of the slats a pull is effected only in one of the control cords. If a pull is exerted for instance in cord 23 the slide 18 will be displaced towards the left (as viewed in Figs. 1 and 2) and if a pull is exerted in cord 24 the slide will be displaced towards the right (as viewed in said figures). A displacement of the slide 18 results, however, in a rotation of the shaft 3 and thus of the drums 6 and consequently the angular position of the slats 14 is changed. A pull in one cord thus results in a turning of the slats in one direction and a pull in the other cord in a turning of the slats in the other direction. The operation of the blind is the same whether the slide according to Fig. 4 or the slide according to Fig. 5 is used.

The design of the Venetian blind according to the invention can be modified within the scope of the appendant claims.

A Venetian blind according to the invention has the following advantages. The angular position of the slats can be set by means of the control cords so that only one pair of cords is necessary for the operation of the blind. The blind is of a very simple design and can therefore be manufactured at low costs.

What I claim and desire to secure by Letters Patent is:

1. A Venetian blind comprising head and bottom rails, a plurality of slats therebetween, ladder tapes including opposed side members and slat supporting cross rungs extending between said slide members, shafts in the head rail longitudinally thereof and having screws formed on part thereof, means in said head rail disposed adjacent each of the ends of said shafts and carrying said ladder tapes, a slide reciprocable in said head rail and provided with apertures adapted to the cross-sectional form and size of the screws on said shafts which are introduced into said apertures of the slide, cord pulley means in said slide, guide pulley means in said head rail, a pair of control cords extending from the bottom rail of the blind over said guide pulley means to the cord pulley means in said slide, one of said control cords passing from said cord pulley means in said slide outside the blind at one side thereof, and further guide pulley means in said head rail for leading the other of said control cords outside the blind at the same side thereof, so that when a pull is exerted on one control cord only the slats of the blind will be set at the desired angles, while a pull exerted on both control cords simultaneously results in a raising of the blind, and a release of both control cords simultaneously in a lowering of the blind.

2. A Venetian blind comprising head and bottom rails, a plurality of slats therebetween, ladder tapes including opposed side members and slat supporting cross rungs extending between said side members, a shaft in the head rail longitudinally thereof and having a screw formed on part thereof, means in said head rail disposed adjacent each of the ends of said shaft and carrying said ladder tapes, a slide reciprocable in said head rail and provided with an aperture adapted to the cross-sectional form and size of the screw on said shaft which is introduced into said aperture, cord pulley means in said slide, guide pulley means in said head rail, a pair of control cords extending from the bottom rail of the blind over said guide pulley means to the cord pulley means in said slide, one of said control cords passing from said cord pulley means in said slide outside the blind at one side thereof, and further guide pulley means in said head rail for leading the other of said control cords outside the blind at the same side thereof, so that when a pull is exerted on one control cord only the slats of the blind will be set at the desired angles, while a pull exerted on both control cords simultaneously results in a raising of the blind, and a release of both control cords simultaneously results in a lowering of the blind.

3. A Venetian blind as claimed in claim 2, wherein said cord pulley means in said slide is a single cord pulley having two grooves, one for each control cord.

4. A Venetian blind as claimed in claim 2, wherein the means in said head rail disposed adjacent each of the ends of said shaft and carrying the ladder tapes are open at the sides longitudinally of the blind and downwardly, the guide pulley means being mounted within said ladder tape carrying means.

5. A Venetian blind comprising head and bottom rails, a plurality of slats therebetween, ladder tapes including opposed side members and slat supporting cross rungs extending between said side members, a shaft in the head rail longitudinally thereof and having a screw formed on part thereof, means in said head rail disposed adjacent each of the ends of said shaft and carrying said ladder tapes, a slide reciprocable in said head rail and provided with an aperture adapted to the cross-sectional form and size of the screw on said shaft which is introduced into said aperture, cord pulley means in said slide, guide pulley means in said head rail, said ladder tape carrying means in said head rail including on both sides thereof transverse supports for the shaft and longitudinal arms secured to said transverse supports and carrying said guide pulley means, a pair of control cords extending from the bottom rail of the blind over said guide pulley means to the cord pulley means in said slide, one of said control cords passing from said cord pulley means in said slide outside the blind at one side thereof, and further guide pulley means in said head rail for leading the other of said control cords outside the blind at the same side thereof, so that when a pull is exerted on one control cord only the slats of the blind will be set at the desired angles, while a pull exerted on both control cords simultaneously results in a raising of the blind, and a release of both control cords simultaneously results in a lowering of the blind.

6. A Venetian blind as claimed in claim 5, said shaft terminating at the inner transverse supports of said ladder tape carrying means, said last-mentioned means having arms projecting from one side thereof and connected with the ends of said shaft, axle journals on said outer transverse supports of said ladder tape carrying means, and arms projecting from the other side of said ladder tape carrying means and connected with said axle journals, whereby said ladder tape carrying means are supported by said shaft and said axle journals.

References Cited in the file of this patent

UNITED STATES PATENTS

| | | |
|---|---|---|
| 1,845,574 | Agee | Feb. 16, 1932 |
| 2,054,164 | Moseley | Sept. 15, 1936 |
| 2,572,291 | Weaver | Oct. 23, 1951 |